United States Patent [19]

Greene

[11] Patent Number: 5,015,152

[45] Date of Patent: May 14, 1991

[54] BATTERY MONITORING AND CHARGING CIRCUIT FOR SUMP PUMPS

[75] Inventor: James L. Greene, Kansas City, Mo.

[73] Assignee: The Marley Company, Mission Woods, Kans.

[21] Appl. No.: 438,802

[22] Filed: Nov. 20, 1989

[51] Int. Cl.⁵ .............................................. F04B 49/04
[52] U.S. Cl. ......................................... 417/40; 417/44
[58] Field of Search ...................... 417/40, 44; 320/39, 320/40

[56] References Cited

U.S. PATENT DOCUMENTS

| | | |
|---|---|---|
| 2,885,623 | 5/1959 | Staufenberg . |
| 3,278,824 | 10/1966 | Runyon . |
| 3,493,837 | 2/1970 | Sparks . |
| 3,753,072 | 8/1973 | Jurgens .................................. 320/39 |
| 3,814,544 | 6/1974 | Roberts et al. ........................ 417/40 |
| 3,939,359 | 2/1976 | Nehushtan et al. . |
| 4,044,268 | 8/1977 | Hammel et al. . |
| 4,150,302 | 4/1979 | Roche . |
| 4,222,711 | 9/1980 | Mayer ...................................... 417/7 |
| 4,225,792 | 9/1980 | Fahey . |
| 4,228,427 | 10/1980 | Niedermeyer ......................... 417/40 |
| 4,237,385 | 12/1980 | Jurgens . |
| 4,284,944 | 8/1981 | Iwanaga et al. . |
| 4,316,097 | 2/1982 | Reynolds . |
| 4,354,149 | 10/1982 | Armond et al. . |
| 4,395,672 | 7/1983 | Gassaway . |
| 4,400,661 | 8/1983 | Duley ................................... 323/275 |
| 4,456,432 | 6/1984 | Mannino ................................ 417/2 |
| 4,467,265 | 8/1984 | Hierholzer Jr. ...................... 320/40 |
| 4,544,910 | 10/1985 | Hoberman . |
| 4,571,531 | 2/1986 | Lin . |
| 4,704,542 | 11/1987 | Hwang . |
| 4,746,852 | 5/1988 | Martin . |

Primary Examiner—Leonard E. Smith
Assistant Examiner—David W. Scheuermann
Attorney, Agent, or Firm—Kokjer, Kircher, Bradley, Wharton, Bowman & Johnson

[57] ABSTRACT

A sump pump powered by a rechargeable battery has a circuit for monitoring the battery voltage and controlling charging of the battery. Four comparators monitor the battery and control two flip flops one of which operates the pump in cooperation with a float switch and the other of which turns the battery charging circuit on and off. The circuit is arranged so that when the battery is in its discharge cycle, the float switch controls the pump and the charging circuit comes on only when the battery voltage is in a low range. In the charging cycle, the pump is locked out in a low voltage range of the battery and is controlled by the float switch only in a high voltage range.

15 Claims, 1 Drawing Sheet

BATTERY MONITORING AND CHARGING CIRCUIT FOR SUMP PUMPS

BACKGROUND AND SUMMARY OF THE INVENTION

This invention relates generally to sump pumps and more particularly to a circuit which monitors and controls the charging of a rechargeable battery used to drive a sump pump.

In the operation of a conventional sump pump, the pump is equipped with a float switch which turns the pump motor on only when the water level in the sump rises high enough to close the float switch. Rechargeable batteries are often used to supply the electrical power for operating the pump motor.

One of the problems with battery powered sump pumps is that the charge/discharge condition of the battery is not controlled in a way to maximize its useful life. Typically, time delay circuits are used to charge the battery, and the battery is not always fully charged during the charge cycle. Other units operate virtually indefinitely in the charging mode and thus overcharge the battery and reduce its operating life by reason of the overcharged battery condition. Conversely, the pump motor can run so long that it pulls the battery charge down below a level where it can be recharged successfully. Again, the life of the battery suffers accordingly. Some sump pump systems have an audible or visual alarm that is activated to provide an indication of an unduly low battery charge. The indicator drains even more current and causes the battery to discharge even more quickly to a condition where it cannot be recharged.

It is thus evident that a need exists for a sump pump in which the battery is continuously monitored so that its charge/discharge cycles can be controlled properly to maximize the operating life of the battery. It is the principal goal of the present invention to meet that need.

More specifically, it is an important object of the invention to provide, in a battery powered sump pump, a monitoring circuit which monitors the condition of the battery at all times and a charging circuit that acts automatically to charge the battery when needed, without overcharging or allowing the battery charge to drop so low that recharging is impossible. In accordance with the invention, the battery voltage is monitored by comparators which control the state of two flip flop circuits. One of the flip flops controls a logic gate that allows the pump motor to operate and the other flip flop controls a charging circuit for the battery.

The circuitry is arranged to automatically turn the charging circuit on when the battery voltage drops to a low level of about 10.5 volts and to automatically turn the charging circuit off when the battery voltage reaches a high level of about 13.6 volts. Thus, the battery is never allowed to discharge enough to damage it or prevent it from being recharged, and overcharging of the battery is also precluded. If the battery is above an intermediate level about (12.5 volts), the pump is controlled wholly by the float switch. In the range of 10.5-12.5 volts, the pump can be turned on by the float switch only if the charging circuit has charged the battery sufficiently to energize a "ready" indicator at about 12.5 volts. Consequently, the battery is allowed to discharge only to 10.5 volts where lockout of the pump occurs, and it is then charged to a relatively high level of at least 12.5 volts before the pump can be cycled on again (discontinuing the lockout function) thus preventing the battery from discharging unduly while providing only a relatively short period of additional pump operation. Unless the float switch closed during the charging cycle, the battery is fully charged (to about 13.6 volts).

The circuit of the present invention lends itself to incorporation in an integrated circuit having suitable interfaces with the mechanical float switch, the pump motor, a transformer which supplies charging current and a piezoelectric alarm which audibly indicates when the pump is running. LED indicators are provided to indicated the state of operation of the system, and membrane switches permit reset and test functions to be effected.

DETAILED DESCRIPTION OF THE INVENTION

Figure 1:
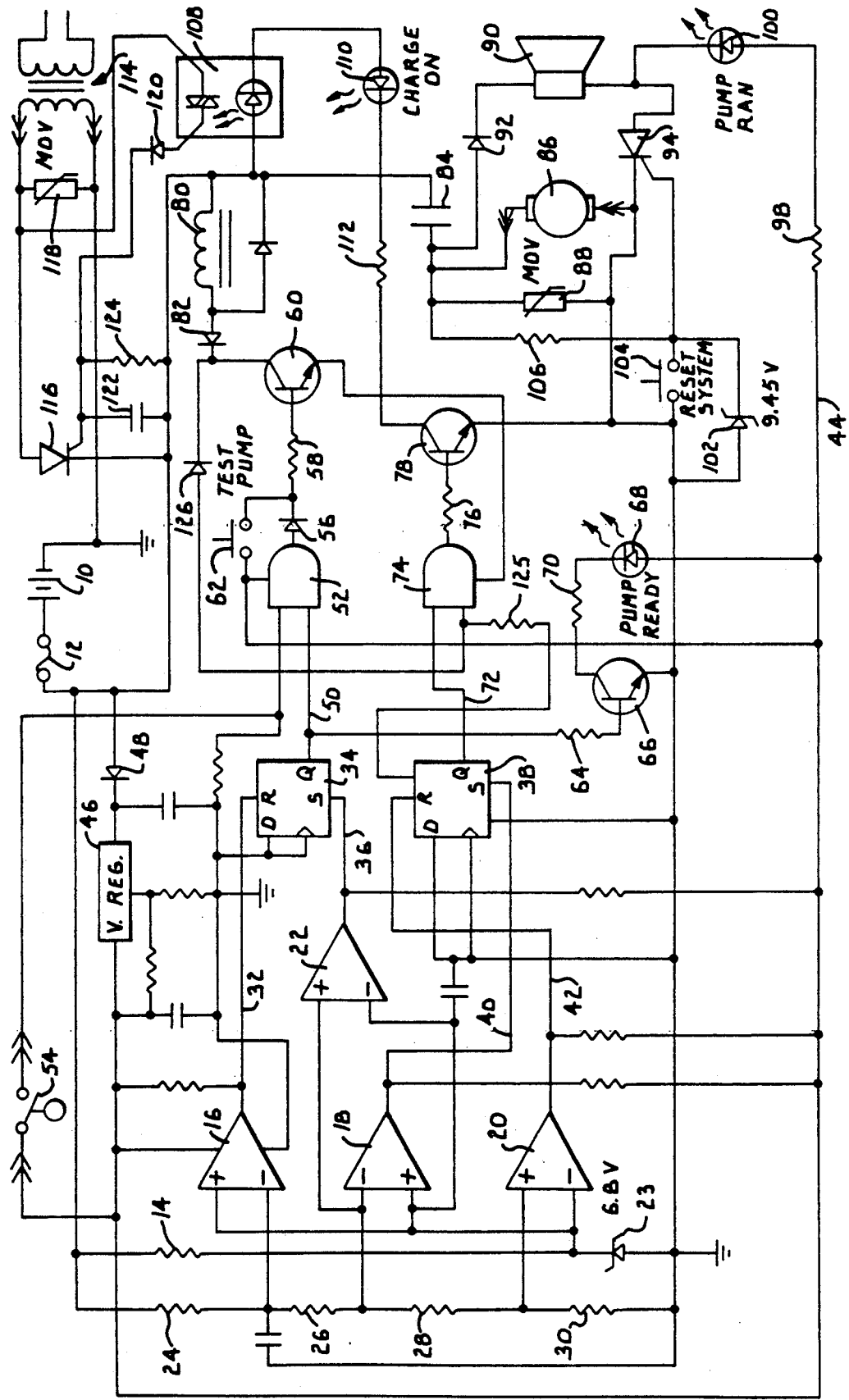

In the accompanying drawing which forms a part of the specification and is to be read in conjunction therewith and in which like reference numerals are used to indicate like parts in the various views:

FIG. 1 is a schematic diagram of a sump pump control system having a battery monitoring and charging circuit constructed according to a preferred embodiment of the present invention.

Referring now to the drawing in more detail, a sump pump control system includes a rechargeable battery 10 which connects on its positive side through a fuse 12 with a resistor 14. The resistor 14 and a Zener diode 23 supply a constant reference voltage to four comparators 16, 18, 20 and 22. The reference voltage is applied to the inverting inputs of comparators 20 and 22 and with the noninverting inputs to the other two comparators. The Zener diode 23 is connected between resistor 14 and ground. Three voltage divider circuits are provided by resistors 24, 26, 28 and 30 which are connected between the battery and ground. The voltage at the junction between resistors 24 and 26 is applied to the inverting input of comparator 16. The voltage at the junction between resistors 26 and 28 is picked off and applied to the inverting input of comparator 18 and to the noninverting input of comparator 22. Finally, the voltage at the junction between resistors 28 and 30 is picked off and applied to the noninverting input of comparator 20.

Comparator 16 has an output line 32 that connects with the reset input of a flip flop 34. The output line 36 of comparator 22 connects with the set input of flip flop 34. Another flip flop 38 has its set input connected with the output line 40 of comparator 18 and its reset input connected with the output line 42 of comparator 20. The output lines from the comparators are connected through suitable resistors with an output line 44 from a voltage regulator 46. The battery 10 connects with the voltage regulator 46 through a diode 48. The voltage of line 44 is maintained at a constant level of 8.48 volts by the voltage regulator 46.

The resistance values are selected such that output line 32 is maintained in a low state whenever the output voltage available from the battery 10 is greater than or equal to 10.5 volts ±2%. When the battery voltage drops below 10.5 volts ±2%, line 32 is placed in a high state to reset flip flop 34, thus causing the Q output line of flip flop 34 to go to a low state. Line 40 is maintained in a low state whenever the battery voltage is greater than or equal to 12.5 volts ±1% and is in a high state only when the battery voltage is less than 12.5 volts ±1%. The polarity of line 36 is opposite that of line 40, and line 36 is thus in a high state only when the battery voltage is greater than or equal to 12.5 volts ±1%. Line 42 is maintained in a low state until the battery voltage rises above 13.6 volts ±4%. It should be noted that the voltage levels that are indicated are held within the precise tolerances that are referenced.

Flip flop 34 has a Q output line 50 which connects with one input to an AND gate 52. The other input to gate 52 comes from line 44 through a float switch 54. The float switch contacts are normally open and are closed only when the water level in the sump rises to a level high enough to cause the float switch to close. The output from the AND gate 52 is applied through a diode 56 and a resistor 58 to the base of a transistor 60 which controls the on/off condition of the sump pump 87. The junction between diode 56 and resistor 58 is connected with line 44 through a normally open test switch 62 which may be depressed to the closed position to apply a high signal to the base of transistor 60 through resistor 58. The manual operated test switch 62 thus allows bypassing of comparators 16 and 22, flip flop 34 and gate 52.

The Q output line 50 of flip flop 34 also connects through a resistor 64 with the base of a transistor 66. A "pump ready" 68 indicates when the pump energizing circuit is armed or ready and is connected between line 44 and ground in series with a resistor 70 and transistor 66. The LED 68 thus energizes whenever transistor 66 conducts.

The Q output line 72 of the other flip flop 38 connects with one input to another AND gate 74. The output of gate 74 connects through a resistor 76 with the base of a transistor 78 which controls a battery charging circuit in a manner that will be described more fully.

The positive side of the battery 10 connects with transistor 60 through a relay coil 80 and a diode 82. Normally open relay contacts 84 are controlled by the relay coil 80 and close whenever the coil is energized. Then, battery power is supplied through the closed contacts 84 and to ground through a pump motor 86 arranged in parallel with a varistor 88. The pump motor 86 is a 12 volt DC motor which causes the sump pump motor to pump liquid out of the sump when the motor is energized.

An alarm horn 90 is connected in parallel with the pump motor 86 in a circuit that includes a diode 92 and a silicon controlled rectifier (SCR) 94. Line 44 connects through a resistor 98 and a "pump ran" LED 100 with the junction between the horn 90 and the anode of SCR 94. A Zener diode 102 is connected between ground and the gate of the SCR 94 in parallel with a normally open reset switch 104. Also connected with the gate of SCR 94 is a resistor 106 which is energized from the battery 10 when the relay contacts 84 are closed.

The positive side of the battery 10 is connected through an optically isolated TRIAC driver circuit 108 with an LED 110 which indicates whether the battery charging circuit is active. The other side of LED 110 connects with transistor 78 through a resistor 112. The emitter of transistor 78 connects with ground so that the charge LED 110 is energized whenever transistor 78 is conductive.

A suitable source of alternating current power is applied to the primary side of a transformer 114, the secondary side of which connects with the battery 10 through a silicon controlled rectifier 116. Whenever the SCR 116 is conductive, the secondary side of transformer 114 supplies a suitable charging current to the battery in order to slowly charge the battery. A varistor 118 is connected in parallel with the secondary side of transformer 114.

The gate of SCR 116 is controlled through circuit 108 and a diode 120. Power from the secondary side of transformer 114 is applied to the gate of SCR 116 whenever circuit 108 is conductive, and this occurs only when transistor 78 is conductive. A capacitor 122 and a resistor 124 are connected in parallel with one another between the positive side of the battery and the gate terminal of SCR 116.

The second input to AND gate 74 is held in a normally high state through a pull up resistor 125. However, the second input to gate 74 goes low through a diode 126 whenever transistor 60 is conductive.

In operation of the sump pump motor, the on/off condition of the pump motor 86 is normally controlled by the float switch 54. Assuming that the battery has been fully charged (to a level of 13.6 volts ±4%), line 42 is placed in a high state to reset flip flop 38. The Q output line 72 then goes low, and transistor 78 is maintained in a nonconductive state. The TRIAC circuit 108 is nonconductive under these conditions, and the SCR 116 is nonconductive to prevent the application of additional charging current to the battery 10. Thus, when the battery level reaches 13.6 volts ±4%, the charging circuit is automatically placed in an idle mode and additional charging of the battery cannot take place.

If the water level in the sump rises to a level high enough to close the float switch 54, one input to AND gate 52 is driven high through the float switch. Because the battery level is above 12.5 volts, line 36 is in a high state and flip flop 34 is set such that its output line 50 is also high. Gate 52 then drives the base of transistor 60 high, and transistor 60 becomes conductive to energize relay coil 80, thus closing relay contacts 84 and supplying battery power to the pump motor 86. The pump motor 86 is thus energized and the sump pump motor operates to pump water from the sump. The gate of SCR 94 is driven high through resistor 106, thus making SCR conductive and energizing the alarm horn 90 which emits an audible signal to indicate that the sump pump is energized. It is also noted that the "pump ran" LED 100 is energized due to the conductive condition of SCR 94.

If the pump removes enough water from the sump to cause float switch 54 to open before the battery voltage has dropped below 12.5 volts, opening of the float switch causes the output line of gate 52 to drop to a low state, thus placing transistor 60 in a nonconductive state. This deenergizes the relay coil 80, causes the relay contacts 84 to open, and deenergizes the pump motor 86 and the horn 90. However, the SCR 94 remains conductive even after the relay contacts 84 have opened, and the LED 100 remains energized to provide a visual indication that the pump motor has been through an operating or pumping cycle. The LED 100 can be deenergized only when the reset switch 104 is intentionally depressed manually in order to pull the gate of the SCR 94 low.

Since the battery voltage remains above 12.5 volts, line 40 remains in a low state and flip flop 38 remains reset. Accordingly, its Q line 72 remains in a low state and gate 74 keeps transistor 78 nonconductive so that the charging circuit cannot enter the charging mode of operation.

When the battery voltage drops below 12.5 volts but is still above 10.5 volts, line 32 remains in a low state and flip flop 34 is not reset so that line 50 remains high. Consequently, the float switch 54 controls the on/off condition of the pump in the same manner indicated previously. However, when the battery voltage drops below 12.5 volts, line 40 is placed in a high condition to set flip flop 38, thus providing a high signal on its Q line 72. So long as the pump motor 86 is deenergized, the second input to gate 74 remains high, and gate 74 drive the base of transistor 78 high. Transistor 78 is then conductive, and the TRIAC circuit 108 and the "charge on" LED 110 are activated. With circuit 108 conductive, the SCR 116 is conductive and charging current is then applied to the battery 10 by the transformer 114. The LED 110 is energized to provide a visual indication that the charging circuit is in its charging mode and the battery is being charged. The float switch 54 controls the on/off condition of the pump motor 86, and the charging circuit is placed in the idle mode automatically when the pump is energized.

When the battery discharges completely to a level below 10.5 volts, the high signal on line 32 resets flip flop 34 and causes line 50 to go to a low state, thus disabling transistor 60 and preventing the relay coil 80 from being energized. This effectively locks the pump motor 86 in a deenergized condition.

This condition remains in effect until such time as the battery charge has reached 12.5 volts. Then, the high signal on line 36 sets flip flop 34 and places line 50 in a high state. If the float switch 54 closes, transistor 60 becomes conductive and the pump motor 86 is energized. One input to gate 74 is pulled low through diode 126 and the charging circuit is placed in the idle mode because transistor 78 becomes nonconductive. As soon as the float switch opens again, the charging circuit is placed in the charging mode, and the battery continues to be charged until its charge has reached a level greater than 13.6 volts. Then, the high signal on line 42 resets flip flop 38 to place the charging circuit in the idle mode via gate 74 and transistor 78.

Summarizing the operation of the battery monitoring and charging circuit, when the battery output is above 12.5 volts ±1% and no greater than 13.6 volts ±4% and the battery is discharging, the charging circuit is in the idle mode and the condition of the float switch 54 controls the on/off condition of the pump motor 86. When the battery voltage drops to a range of 10.5 volts ±2%-12.5 volts ±1% and is discharging, the on/off condition of the pump motor 86 is still controlled by the float switch. However, the charging circuit is in the charging mode whenever the pump is deenergized; i.e., whenever the float switch is open. When the battery voltage drops below 10.5 volts ±2%, the charging circuit is immediately placed in the charging mode and the pump motor 86 is deenergized and locked in a deenergized condition until the battery voltage rises to 12.5 volts ±1%. When the system is in the charging mode above a battery voltage of 12.5 volts ±1%, the pump motor 86 is again controlled by the float switch. The charging circuit is in the charging mode except when the float switch is closed to place the pump in the energized condition.

It is noted that the battery charging circuit charges the battery except when the battery voltage reaches 13.6 ±4% volts, when the battery is discharging from 13.6 volts in the high range between 13.6 and 12.5 volts, when the pump is energized during the charging cycle with the battery voltage in the high range (12.5–13.6 volts) or when the pump is energized during the discharge cycle with the battery in the low range of 10.5–12.5 volts. Thus, the battery charging circuit is in the idle mode only when (1) the battery has been fully charged to 13.6 volts ±4% and is idling down to 12.5 volts, (2) when the ready LED 68 is on and the battery is in the high range (12.5–13.6) and still being charged when the float switch closes, and (3) when the ready LED 68 is on and the battery is in the low range (10.5–12.5) and still discharging when the float switch closes.

In this manner, the battery 10 is allowed to fully discharge to a level of 10.5 volts, but the charging circuit comes on automatically and the pump is locked out of operation as soon as the minimum level of 10.5 volts is reached. Then, the battery is charged up to at least 12.5 volts before the pump can come on again, and the battery is eventually fully charged to a level of 13.6 volts, at which time the charging circuit is placed in the idle mode to avoid excessive charging of the battery. Thus, the battery is allowed to cycle between the fully charged and fully discharged conditions, and the pump operation is controlled by the condition of the float switch except when the battery is being charged up from 10.5 volts and has not reached 12.5 volts. The arrangement of the battery monitoring and charging circuit maximizes the operating life of the battery by carefully controlling the charge/discharge cycles and also by avoiding undue charging or discharging of the battery.

The "ready" LED 68 is energized whenever transistor 66 is conductive, and this occurs whenever line 50 is in a high state. Thus, LED 68 is energized to provide a visual indication that the pump motor 86 is "armed" or "ready" whenever the battery voltage is 12.5 or above and also whenever the battery is in the discharge cycle and is not fully discharged to a level of 10.5 volts.

As previously indicated, LED 110 is energized whenever the charging circuit is in the charging mode, and it thus provides a visual indication that the battery is being charged. The "pump ran" LED 100 is energized whenever the pump motor 86 has been energized, and LED 100 remains energized until such time as the reset switch 104 is intentionally depressed. The test switch 62 can be depressed at any time to place transistor 60 in a conductive state and energize the pump motor regardless of the condition of the battery, the battery charging circuit or the float switch. Depression of the test switch 62 also deactivates the charging circuit if it is active at the time.

In actual practice, that the reset switch 104 and test switch 62 are incorporated into a label on a control box which contains the circuitry, and these switches may be touch sensitive membrane type switches. The commercial form of the circuitry takes the form of a semi-custom logic array integrated circuit rather than the form of the discrete components illustrated in the drawing.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations.

This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Control apparatus for a sump pump having a float switch which assumes first and second conditions, said apparatus comprising:

a rechargeable battery having a charging cycle and a discharge cycle;

means for monitoring the output voltage available from the battery;

means for establishing a low range of said output voltage between a preselected minimum level and a preselected intermediate level and a high range of said output voltage between said intermediate level and a preselected maximum level, aid intermediate level being between said minimum and maximum levels;

a battery charging circuit having a charging mode in which charging current is applied to the battery and an idle mode in which charging current to the battery is discontinued;

means for effecting the idle mode of the charging circuit when said output voltage reaches said maximum level;

means for deenergizing the pump whenever the float switch is in the first condition thereof;

means, effective when the battery is in the discharge cycle with said output voltage in said high range, for effecting the idle mode of the charging circuit and for energizing the pump from the battery when the float switch is in its second condition;

means, effective when the battery is in the discharge cycle with said output voltage in the low range, for energizing the pump from the battery when the float switch is in its second condition and for effecting the charging mode of the charging circuit whenever the pump is deenergized;

means for effecting the charging mode of the charging circuit whenever said output voltage drops to said minimum level;

means, effective when the battery is in the charging cycle with said output voltage in the low range, for maintaining the pump deenergized and for maintaining the charging circuit in the charging mode; and means, effective when the battery is in the charging cycle with said output voltage in the high range, for energizing the pump from the battery when the float switch is in its second condition and for effecting the charging mode of the charging circuit whenever the pump is deenergized.

2. Apparatus as set forth in claim 1, including a visual indicator and means for activating said indicator when the charging circuit is in the charging mode.

3. Apparatus as set forth in claim 1, including:

a visual indicator for indicating a ready condition of the pump;

means for activating said indicator when the battery is in the discharge cycle and when the battery is in the charging cycle with said output voltage in the high range; and means for deactivating said indicator when the battery is in the charging cycle with said output voltage in the low range.

4. Apparatus as set forth in claim 1, including:

a visual indicator for indicating when the pump has been energized;

means for activating said indicator when the pump is energized and for maintaining said indicator activated when the pump is deenergized after having been energized; and manual reset switch means for deactivating said indicator.

5. Apparatus as set forth in claim 1, including manual switch means for energizing the pump from the battery under all conditions of the float switch and charging circuit.

6. In a sump pump having a pump motor, a float switch which assumes first and second conditions and a rechargeable battery for supplying electrical power to the pump motor, the improvement comprising:

a battery charging circuit having a charging mode in which charging current is applied to the battery and an idle mode in which charging current to the battery is discontinued;

means for monitoring the output voltage available from the battery, said charging circuit being in the charging mode whenever said output voltage drops to a preselected minimum level and in the idle mode whenever said output voltage reaches a preselected maximum level;

means for deenergizing the pump motor whenever the float switch is in the first condition and whenever the battery is in a charging cycle with said output voltage in a low range between said minimum level and an intermediate level which is between said minimum and maximum levels;

means for energizing the pump motor from the battery when the float switch is in the second condition and said output voltage is in a high range between said intermediate level and said maximum level, and when the float switch is in the second condition with the battery in a discharge cycle and said output voltage in said low range; and means for effecting the charging mode of the charging circuit when all conditions except when said output voltage is in said high range with the battery in the discharge cycle, except when the pump is energized with said output voltage in the high range and the battery in the charging cycle, and except when the pump is energized with said output voltage in the low range and the battery in the discharge cycle.

7. The improvement of claim 6, including a visual indicator and means for activating said indicator when the charging circuit is in the charging mode.

8. The improvement of claim 6, including: a visual indicator for indicating a ready condition of the pump;

means for activating said indicator when the battery is in the discharge cycle and when the battery is in the charging cycle with said output voltage in the high range; and means for deactivating said indicator when the battery is in the charging cycle with said output voltage in the low range.

9. The improvement of claim 6, including:

a visual indicator for indicating when the pump has been energized;

means for activating said indicator when the pump is energized and for maintaining said indicator activated when the pump is deenergized after having been energized; and manual reset switch means for deactivating said indicator.

10. The improvement of claim 6, including manual test switch means for energizing the pump motor under all conditions of the float switch and charging circuit.

11. A sump pump comprising:

an electric pump motor;

a rechargeable battery having charging and discharge cycles;

a pump control circuit connecting said battery with said pump motor to energize the latter when completed;

a float switch having a first condition and a second condition, said pump control circuit being interrupted in the first condition of said float switch;

a battery charging circuit having a charging mode in which charging current is applied to the battery and an idle condition in which charging current to the battery is discontinued;

means for monitoring the output voltage available from the battery;

means for effecting the charging mode of said charging circuit when said output voltage drops to a preselected minimum level;

means for effecting the idle mode of said charging circuit when said output voltage reaches a preselected maximum level;

means for establishing a locked out condition of the pump when said charging circuit is in the charging mode to charge the battery from said minimum level and said output voltage is in a low range between said minimum level and a preselected intermediate level which is between the minimum and maximum levels, said pump control circuit being interrupted under both conditions of the float switch when the pump is in the locked out condition;

means for establishing a ready condition of the pump when the pump is not in the locked out condition, said pump control circuit being completed whenever the float switch is in the second condition and the pump is in the ready condition; and means for effecting the charging mode of the charging circuit under all conditions except when said output voltage reaches said maximum level, except when the battery is discharging in said high range after having been charged to said maximum level, except when the float switch assumes the second condition with said output voltage in the low range and the pump in the ready condition, and except when the float switch assumes the second condition while the battery is being charged in the high range.

12. The pump of claim 11, including a visual indicator and means for activating said indicator when the charging circuit is in the charging mode.

13. The pump of claim 11, including:

a visual indicator for indicating a ready condition of the pump;

means for activating said indicator when the battery is in the discharge cycle and when the battery is in the charging cycle with said output voltage in the high range; and means for deactivating said indicator when the battery is in the charging cycle with said output voltage in the low range.

14. The pump of claim 11, including:

a visual indicator for indicating when the pump has been energized;

means for activating said indicator when the pump is energized and for maintaining said indicator activated when the pump is deenergized after having been energized; and manual reset switch means for deactivating said indicator.

15. The pump of claim 11, including manual test switch means for energizing the pump motor under all conditions of the float switch and charging circuit.

* * * * *